Patented July 8, 1941

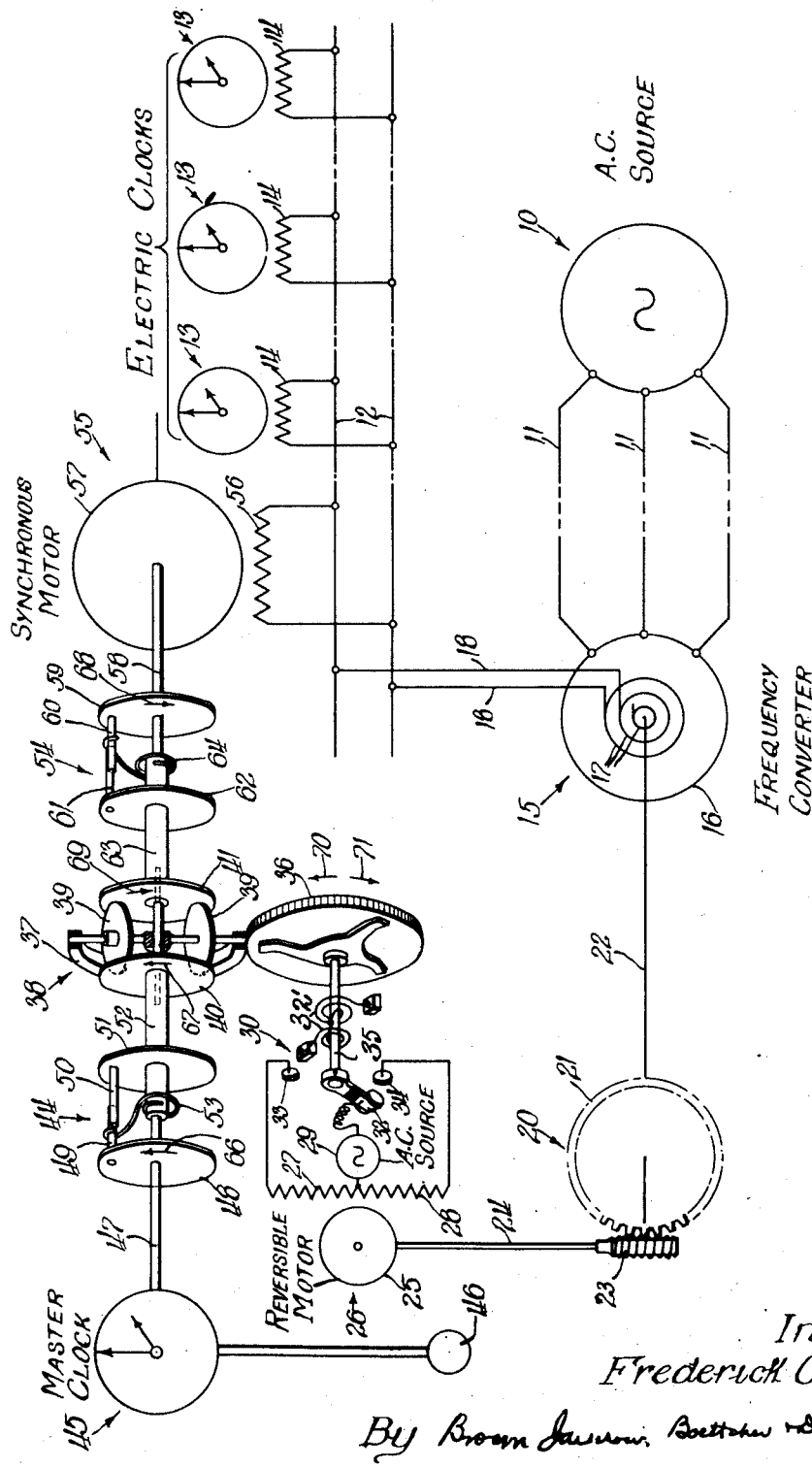

2,248,237

UNITED STATES PATENT OFFICE 2,248,237

ELECTRIC CLOCK SYSTEM

Frederick C. Holtz, Springfield, Ill., assignor to Sangamo Electric Company, Springfield, Ill., a corporation of Illinois Application July 2, 1938, Serial No. 217,298

11 Claims. (Cl. 58—24)

My invention relates, generally, to time distributing systems and it has particular relation to electrically operated time distributing systems in which a commercial alternating current source is employed.

It is now the generally accepted practice to operate electric clocks from a commercial alternating current source such as a sixty-cycle source. Ordinarily the frequency of commercial alternating current sources is accurately controlled so that, during normal operation, the clocks connected thereto provide an accurate indication of the time. Generally, there are two types of clocks that are employed for this purpose.

One of these types is the self-starting clock. This clock is provided with a synchronous electric motor that is automatically brought up to synchronous speed as soon as it is energized.

The other type of clock is the non-self-starting clock. This clock requires some means for starting it in operation on its being energized. This may take the form of an extended shaft which is manually rotated to bring the rotor up to the desired speed.

As indicated, both of these types of clocks depend for their accuracy upon the accuracy of the control of the frequency of the commercial alternating current source. If this frequency varies above or below a given frequency, for example sixty cycles, then the accuracy of the clocks varies accordingly.

Certain difficulties are encountered when the commercial alternating current source fails. In such case the clocks are immediately deenergized and, of course, they stop. When the service is restored, the self-starting clocks are placed automatically in operation but they are inaccurate in an amount corresponding to the period of service interruption. In order to indicate that the power has failed and that the time indicated by the clock is not correct, certain types of self-starting clocks are provided with indicators which are operated on failure of the commercial alternating current source to show that the clock should be reset. The stoppage of the non-self-starting clock, of course, indicates that the service has failed and it is common practice to reset them before manually restarting them.

It will be obvious that there are certain disadvantages inherent in either of these types of clocks either because of variations in the frequency of the commercial alternating current source or because of failures thereof for periods of sufficient length to permit the clocks to stop.

The object of my invention, generally stated, is to provide an improved time distributing system which shall be simple, efficient, and accurate in operation and which may be readily and economically installed.

An object of my invention is to derive a given frequency for an electric clock circuit from a commercial alternating current source regardless of the variations of the frequency of the commercial alternating current source.

Another object of my invention is to derive a given number of alternations of current from a commercial alternating current source and apply them to an electric clock circuit within a given period of time regardless of variations of the frequency of the commercial alternating current source or even failure thereof.

A further object of my invention is to energize an electric clock circuit from a commercial alternating current source and regulate the frequency of the electric clock circuit independently of the frequency of the commercial alternating current source.

Still another object of my invention is to totalize the number of alternations that would otherwise have been applied to an electric clock circuit from a commercial alternating current source during periods of failure thereof and to apply a like number to the electric clock circuit on restoration of the commercial alternating current source in addition to the number normally applied to reset the electric clocks to the time of a master clock.

According to my invention, I provide for energizing an electric clock circuit to which a plurality of electric clocks may be connected from a commercial alternating current source through a frequency converter. If the frequency of the alternating current source is the same as the operating frequency of the electric clock circuit, this frequency is fed directly through the frequency converter. However, if the frequency of the commercial alternating current source is above or below the given frequency of the electric clock circuit, then the frequency converter is operated in one direction or the other to decrease or increase the frequency that is fed thereby from the commercial alternating current source to the electric clock circuit. The frequency converter operates under the control of a master clock. Means are provided, in the event of failure of the commercial alternating current source, for totalizing the number of alternations that would otherwise have been applied to the electric clock circuit during the period of failure and then applying them to the electric clock circuit on restoration of the commercial alternating current source in addition to the number that are normally applied thereby in order to reset the electric clocks to the time of the master clock.

Other objects of my invention will, in part, be obvious and, in part, appear hereinafter.

My invention, accordingly, is disclosed in the embodiment thereof shown in the accompanying drawing, and it comprises the features of construction, combination of elements and arrangement of parts which will be exemplified in the construction hereinafter set forth, and the scope of the application of which will be indicated in the appended claims.

For a more complete understanding of the nature and scope of my invention reference may be had to the following detailed description taken in connection with the accompanying drawing in which the single figure diagrammatically represents a concrete embodiment of my invention.

Referring now particularly to the single figure in the drawing, it will be observed that the reference character 10 designates, generally, a commercial alternating current source, such as a sixty-cycle source which is arranged to energize line conductors 11. It will be understood that the source 10 and conductors 11 are merely illustrative of any suitable alternating current source and distribution system provided with the usual generators, transformers, and the like.

A special electric clock circuit, formed by the pair of conductors 12, is provided for energizing any desired number of electric clocks, shown generally at 13, and each having a field winding 14. The clocks 13 may be of either of the two general types described hereinbefore, although they are, preferably, of the self-starting type. Since the features of construction of the clocks 13 are well known and form no part of the present invention, these clocks are illustrated diagrammatically only and the details of construction thereof will not be set forth herein.

The electric clock circuit 12 is arranged to be energized through a frequency converter, shown generally at 15, from the conductors 11 and commercial alternating current source 10. The frequency converter 15 is of conventional type. It comprises a construction that is similar to that of a wound rotor polyphase induction motor having a distributed stator winding, illustrated at 16, and a wound rotor with slip rings illustrated at 17. For purposes of illustration a polyphase frequency converter 15 is shown, but it will be understood that a single phase frequency converter may be employed if desired. Since it is desirable to energize the electric clock circuit 12 with single phase alternating current only, two of the slip rings of the rotor 17 are connected by conductors 18 across the electric clock circuit 12, as shown.

Now, as long as the rotor 17 of the frequency converter 15 remains stationary, the frequency applied to the electric clock circuit 12 will be that applied to the line conductors 11 by the commercial alternating current source 10. When the rotor 17 is rotated by external means in the direction in which the field of the stator 16 rotates, then the frequency applied to the electric clock circuit 12 will be less than the frequency of the commercial alternating current source 10. In like manner, when the rotor 17 is rotated by the external means in the opposite direction to that in which the field of the stator 16 revolves, the frequency that is applied to the electric clock circuit 12 is greater than the frequency which is applied to the line conductors 11 by the commercial alternating current source 10. By controlling the amount and direction of rotation of the rotor 17, it is possible to maintain a given frequency on the electric clock circuit 12 regardless of variations in the frequency applied by the commercial alternating current source 10 and to take care of failure of the same for short periods. The manner and means whereby this is accomplished will now be set forth.

With a view to driving the rotor 17 a reduction gearing mechanism, shown generally at 20 is provided. It is provided with a worm wheel 21 that is mounted on a shaft 22 on which the rotor 17 is also mounted. A worm 23 carried by a shaft 24 engages the teeth of the worm wheel 21, as shown. The rotor 25 of a reversible motor, shown generally at 26, is secured to the shaft 24. The motor 26 is provided with field windings 27 and 28 that may be energized from a suitable source 29 of alternating current for operating the motor 26 in one direction or the other, depending upon whether the field winding 27 or the field winding 28 is energized. A switch, shown generally at 30, is provided for selectively energizing the field windings 27 and 28. It comprises a switch arm 32, which, as shown, is arranged to engage either stationary contact member 33, connected to the field winding 27, or stationary contact member 34, connected to the field winding 28. The switch arm 32 is mounted for rotation with a shaft 35 that carries a gear wheel 36 meshing with a ring gear wheel 37 of a differential gear mechanism, shown generally at 38.

The differential gear mechanism 38 is typical of any suitable differential mechanism that may be employed for effecting the desired movement of the switch arm 32 in accordance with certain predetermined conditions. It comprises a pair of planet wheels 39, suitably mounted on the ring gear wheel 37, and arranged to mesh with spur wheels 40 and 41.

The spur wheel 40 is connected through a lost motion mechanism, shown generally at 44, to a master clock, shown generally at 45. The master clock 45 may be of any suitable type, such as a clock provided with pendulum 46, that may be used as a standard because of its accurate time keeping qualities. It may be driven by any suitable manner such as by a spring or weight, as will be readily understood.

The master clock 45 is arranged to drive a shaft 47 on which is mounted a wheel or disc 48, forming a part of the lost-motion mechanism 44. A pin 49 projects axially from one side of the wheel or disc 48 into the path of another similar pin 50 that is carried by a wheel or disc 51 mounted on a shaft 52 for rotation therewith. A spiral spring 53 is provided with one end fastened to the shaft 52 and the other end fastened to the pin 49 for biasing the pin 49 into engagement with the pin 50 during normal operating conditions.

The spur wheel 41 of the differential gear mechanism 38 is connected through a lost-motion mechanism 54 to a synchronous motor, shown generally at 55. The motor 55 may be of any suitable self-starting type and it has a field winding 56 that is connected for energization across the electric clock circuit 12, as shown. The motor 55 is also provided with a rotor 57 that is mounted for rotation with a shaft 58.

The lost-motion mechanism 54 is similar in construction to that of the lost-motion mechanism 44, previously described. It comprises a wheel or disc 59 that is mounted for rotation with the shaft 58 and that carries a pin 60 projecting axially therefrom into the path of a pin 61 that is carried by a wheel or disc 62 fastened on a shaft 63 on which the spur wheel 41 is secured. A spiral spring 64, having one end connected to the pin 60 and the other end connected to the shaft 63 serves to bias the pins 60 and 61 into engagement under normal operating conditions.

In describing the functioning of my improved time distributing system, it will first be assumed that the frequency applied by the commercial alternating current source 10 through the frequency converter 15 to the electric clock circuit 12 is exactly the frequency that is required to keep the electric clocks 13 in synchronism with the master clock 45. In other words, the time indicated by each of the electric clocks 13 corresponds exactly with the time indicated by the master clock 45. Under these conditions the master clock 45 drives the wheel or disc 48 in the direction indicated by the arrow 66 thereon and causes the spur wheel 40 to rotate therewith in the same direction as indicated by the arrow 67 thereon. Likewise, the synchronous motor 55, energized from the electric clock circuit 12, drives the wheel or disc 59 in the direction indicated by the arrow 68 thereon and it, in turn, drives the spur wheel 41 in the direction indicated by the arrow 69 thereon. Under the assumed conditions the speed of rotation of the spur wheels 40 and 41 is the same and they rotate in opposite directions. Therefore, the ring gear wheel 37 remains motionless and there is no rotation of the gear wheel 36 and, consequently, no movement of the contact arm 32. It floats in some position between the stationary contact members 33 and 34. Since neither of the field windings 27 and 28 of the motor 26 is energized, its rotor 25 is stationary as is likewise the rotor 17 of the frequency converter 15.

Assuming now that the frequency of the commercial alternating current source 10 is increased, for example is increased to sixty-one or sixty-two cycles per second, then the frequency applied to the electric clock circuit 12 is above the given frequency and the electric clocks 13 become fast. Likewise the rotor 57 of the synchronous motor 55 is rotated at a higher speed and, consequently, the spur wheel 41 rotates in the direction indicated by the arrow 69 at a speed that is higher than that of the spur wheel 40. As a result, the ring gear wheel 37 is rotated in such direction as to rotate the gear wheel 36 in the direction indicated by the arrow 70. The contact arm 32 is then moved into contact engagement with the stationary contact member 34 and the reversible motor 26 is energized. The rotor 25 is then caused to rotate the rotor 17 of the frequency converter 15 in the direction in which the rotating field of the stator 16 revolves to reduce the frequency that is applied to the electric clock circuit 12 below the frequency that is applied to the line conductors 11 by the commercial alternating current source 10. As soon as the frequency on the electric clock circuit 12 is reduced, the speed of the synchronous motor 55 is reduced and the contact arm 32 is no longer held in contact engagement with the stationary contact member 34. If desired, centering springs 32' may be provided for the contact arm 32 for the purpose of moving it out of contact engagement with either of the stationary contact members 33 or 34 once the force urging it into contact engagement with either of them is removed. If the frequency of the commercial alternating current source 10 remains above the given frequency intended to be applied to the electric clock circuit 12, then the foregoing cycle of operations will be repeated so that the total number of alternations applied to the electric clock circuit 12 in any given period will be the same regardless of the frequency of the commercial alternating current source 10.

If the frequency applied to the electric clock circuit 12 should remain above the given frequency for a considerable period of time, the contact arm 32 would remain in engagement with the stationary contact member 34. Ordinarily, the frequency converter 15 will be arranged to provide a variation of ten percent, for example, above or below the frequency applied thereto from the line conductors 11 by the commercial alternating current source 10. It may happen that the frequency of the commercial alternating current source 10 will be above the frequency for which the frequency converter 15 can compensate. In such case, the contact arm 32 remains in contact engagement with the stationary contact member 34 and, since the gear wheel 36 is prevented from rotating thereby, the ring gear wheel 37 remains stationary. The speed of the synchronous motor 55 then is such that the wheel or disc 59 directly connected thereto rotates at a higher speed than the wheel or disc 62 is permitted to rotate because of the mechanical connection through the differential gear mechanism 38 to the master clock 45. The pin 60 is then moved away from the pin 61 and the spiral spring 64 is further tensioned. The separation of the pins 60 and 61 is measure of the departure of the number of alternations applied to the electric clock circuit 12 above the number that should have been applied in a given period. Assuming that the frequency of the commercial alternating current source 10 is restored to the frequency at which the electric clock circuit 12 is intended to operate before the pin 60 moves through 360° relative to the pin 61, then the contact arm 32 will remain in contact engagement with the stationary contact member 34 for a period sufficiently long after the frequency of the commercial alternating current source is retorted to the normal value to apply a reduced frequency to the electric clock circuit 12. The relative position of the pin 60 with respect to the pin 61 will be restored to that shown in the drawing, at which time the contact arm 32 will separate from the stationary contact member 34 and the reversible motor 26 will be deenergized.

Assuming now that the frequency of the commercial alternating current source falls below the given frequency intended to be applied to the electric clock circuit 12, then the speed of the rotor 57 of the synchronous motor 55 is reduced and there is a corresponding reduction in the speed of rotation of the spur wheel 41 as compared to the speed of rotation of the spur wheel 40. As a result, the ring gear wheel 37 is rotated in a direction opposite to that previously described to cause the gear wheel 36 to rotate in a correspondingly opposite direction as indicated by the arrow 71. The contact arm 32 is then caused to move into contact engagement with the stationary contact member 33 and the rotor 25 of the reversible motor 26 is caused to rotate in a direction the reverse of that previously described. The rotor 17 of the frequency converter 15 is then rotated in a direction opposite to the rotation of the field of the stator 16 and a frequency is applied to the electric clock circuit 12 that is higher than the frequency which is applied to the conductors 11 by the commercial alternating current source 10. This continues until the time indicated by the electric clock 13 corresponds to the time of the master clock 45. At this instant the spur wheels 40 and 41 of the differential gear mechanism 38 are rotating in opposite directions at the same speed and, therefore, the contact arm 32 is permitted to move out of engagement with the stationary contact member 33.

It will now be obvious that the contact arm 32 will move between either extremes of its position into contact engagement with either of the stationary contact members 33 or 34 depending upon whether the frequency of the commercial alternating current source 10 is above or below the given frequency at which the electric clock circuit 12 is intended to operate. The contact arm 32, as indicated hereinbefore, will float between these two extreme positions when the frequency of the commercial alternating current source 10 corresponds to the desired frequency for energization of the electric clock circuit 12.

The lost motion mechanism 44 functions in a manner similar to that of a lost motion mechanism 54, previously described, when the frequency of the commercial alternating current source 10 remains for a considerable period below the given frequency of the electric clock circuit 12. The lost motion mechanism 44 is of particular importance when the commercial alternating current source 10 fails completely for some interval, such as for ten or fifteen minutes. In such case the electric clock circuit 12 is not energized and, of course, the electric clocks 13 are stopped. Likewise, the synchronous motor 55 is deenergized and no rotation of its rotor 57 or of the spur wheel 41 driven thereby takes place. The gear wheel 36 is then rotated in a direction indicated by the arrow 71, since the shaft 47 driven by the master clock 45 continues to revolve, and the contact arm 32 engages the stationary contact member 33. Since the commercial alternating current source 10 has failed under the assumed conditions, operation of the reversible motor 26 to rotate the rotor 17 of the frequency converter 15 is ineffective to restore the desired frequency to the electric clock circuit 12.

However, the shaft 47 driven by the master clock 45 continues to rotate and drives the wheel or disc 48 carried thereby in the direction indicated by the arrow 66. Since the contact arm 32 is stopped in contact engagement with the stationary contact member 33, and the spur wheel 41 is motionless, no rotation of the spur wheel 40 or the wheel or disc 51 is permitted. Consequently, the pin 49 carried by the wheel or disc 48 moves out of engagement with the pin carried by the wheel or disc 51. The spiral spring 53 is tensioned.

Assuming now that the commercial alternating current source 10 is restored before the pin 49 rotates through approximately 360° relative to the pin 50, and that this frequency is that at which the electric clock circuit 12 is intended to operate, then the contact arm 32 will remain in contact engagement with the stationary contact member 33 and the reversible motor 26 will drive the rotor 17 of the frequency converter 15 in the direction opposite to the rotation of the rotating field of the stator 16 to apply to the electric clock circuit 12 a frequency which is higher than the normal frequency. The electric clocks 13 will then be operated at a faster speed than the normal speed until the time indicated thereby corresponds to that of the master clock 45. At this instant the pin 49 will have returned into engagement with the pin 50, as shown in the drawing, and the arm 32 will be permitted to move out of contact engagement with the stationary contact member 33. The system will then continue to operate under normal operating conditions, as previously described, until there is some change in the frequency of the commercial alternating current source 10.

It will now be obvious that I have provided a time distributing system in which the electric circuit to which the electric clocks are adapted to be connected will have a given number of alternations applied thereto in a given period as measured by the master clock from a commercial alternating current source regardless of variations in frequency of this source and even failure thereof. Of course, it will be understood that there are certain limits in this range of regulation but for all practical purposes this statement of functioning of the system can be considered to correctly represent how it operates. Therefore, it is unnecessary to carefully note whether a clock connected to my improved time distributing system has its indicator operated to denote that the service has failed, as in the case of certain self-starting clocks as previously described or to note that the clock of the non-self-starting type has stopped and should be restarted and reset, also as previously described. All of the clocks connected in a time distributing system of the type herein described, are automatically kept in synchronism with the master clock which can, of course, be easily regulated to keep accurate time. Such a system is particularly advantageous when the clocks are located at places where it is inconvenient to reach them for resetting or restarting them.

It is likely that the commercial alternating current source 10 may fail for a period that is longer than can be compensated for by any given control mechanism, as described herein, then an auxiliary source of alternating current can be provided which would be automatically connected to the line conductors 11 a predetermined time after the commercial alternating current source 10 failed. However, it is extremely unlikely that such an auxiliary power supply would be required in view of the rare occurrence of a power failure for periods longer than a few minutes.

Since certain further changes may be made in the above construction and different embodiments of the invention may be made without departing from the scope thereof, it is intended that all matter contained in the foregoing description or shown in the accompanying drawing shall be interpreted as illustrative and not in a limiting sense.

I claim as my invention:

1. In a time distributing system, the combination with a commercial alternating current source of an electric clock circuit adapted to have a plurality of electric clocks connected thereto, means interconnecting said commercial alternating current source and said electric clock circuit, master clock means, and means controlled by said master clock means for increasing and decreasing the frequency applied to said electric clock circuit as a function, respectively, of its departure below and above a predetermined frequency independently of the frequency of said commercial alternating current source.

2. In a time distributing system, the combination with a commercial alternating current source of an electric clock circuit adapted to have a plurality of electric clocks connected thereto, means interconnecting said commercial alternating current source and said electric clock circuit, master clock means, and means controlled by said master clock means and in accordance with the frequency of said electric clock circuit for increasing and decreasing said frequency as a function, respectively, of its departure below and above a given frequency independently of the frequency of said commercial alternating current source.

3. In a time distributing system, the combination with a commercial alternating current source of an electric clock circuit adapted to have a plurality of electric clocks connected thereto, frequency transfer means interconnecting said commercial alternating current source and said electric clock circuit, master clock means, and differential means controlled by said master clock means and in accordance with the frequency of said electric clock circuit for regulating the operation of said frequency transfer means in such manner as to apply a frequency to said electric clock circuit that is higher than the frequency of said commercial alternating current source in the event that the same is lower than a given frequency and to apply a frequency to said electric clock circuit that is lower than the frequency of said commercial alternating current source in the event that the same is higher than said given frequency.

4. In a time distributing system, the combination with a commercial alternating current source of an electric clock circuit adapted to have a plurality of electric clocks connected thereto, a frequency converter interconnecting said commercial alternating current source and said electric clock circuit, means for driving said frequency converter in one direction or the other to apply substantially a given frequency to said electric clock circuit substantially regardless of the frequency of said commercial alternating current source, and means for controlling the functioning of the driving means in accordance with the departure of the frequency applied to said electric clock circuit from said given frequency.

5. In a time distributing system, the combination with a commercial alternating current source of an electrical clock circuit adapted to have a plurality of electric clocks connected thereto, a frequency converter interconnecting said commercial alternating current source and said electric clock circuit, means for driving said frequency converter in one direction or the other to apply substantially a given frequency to said electric clock circuit substantially regardless of the frequency of said commercial alternating current source, master clock means, and means controlled in accordance with the frequency of said electric clock circuit and by said master clock means for regulating the operation of the driving means.

6. In a time distributing system, the combination with a commercial alternating current source of an electric clock circuit adapted to have a plurality of electric clocks connected thereto, a frequency converter interconnecting said commercial alternating current source and said electric clock circuit, means for driving said frequency converter in one direction or the other to apply substantially a given frequency to said electric clock circuit substantially regardless of the frequency of said commercial alternating current source, master clock means, and differential means controlled in accordance with the frequency of said electric clock circuit and by said master clock means for regulating the operation of the driving means in such manner as to apply a frequency to said electric clock circuit that is higher than the frequency of said commercial alternating current source in the event that the same is lower than a given frequency and to apply a frequency to said electric clock circuit that is lower than the frequency of said commercial alternating current source in the event that the same is higher than said given frequency.

7. In a time distributing system, the combination with a commercial alternating current source of an electric clock circuit adapted to have a plurality of electric clocks connected thereto, a frequency converter having relatively rotatable primary and secondary winding means connected respectively to said commercial alternating current source and said electric clock circuit, driving means for rotating one of said winding means relative to the other in either direction, master clock means, and means controlled by said master clock means for regulating the operation of said driving means to relatively rotate said winding means in one direction when the frequency of said clock circuit is below a predetermined frequency and in the opposite direction when the frequency of said clock circuit is above said predetermined frequency.

8. In a time distributing system, the combination with a commercial alternating current source of an electric clock circuit adapted to have a plurality of electric clocks connected thereto, a frequency converter having relatively rotatable primary and secondary winding means connected respectively to said commercial alternating current source and said electric clock circuit, driving means for rotating one of said winding means relative to the other, master clock means, and differential means controlled by said master clock means and in accordance with the frequency of said electric clock circuit for regulating the operation of said driving means in such manner as to apply a frequency to said electric clock circuit that is higher than the frequency of said commercial alternating current source in the event that the same is lower than a given frequency and to apply a frequency to said electric clock circuit that is lower than the frequency of said commercial alternating current source in the event that the same is higher than said given frequency.

9. In a time distributing system, the combination with a commercial alternating current source of an electric clock circuit adapted to have a plurality of electric clocks connected thereto, a frequency converter having relatively rotatable primary and secondary winding means connected respectively to said commercial alternating current source and said electric clock circuit, reversible driving means for rotating one of said winding means in either direction relative to the other, control means for said driving means disposed to effect reverse operation of the same, master clock means, synchronous motor means connected for energization to said electric clock circuit, and differential gearing means operatively interconnecting said control means with said master clock means and said synchronous motor means.

10. In a time distributing system, the combination with a commercial alternating current source of an electric clock circuit adapted to have a plurality of electric clocks connected thereto, a frequency converter having relatively rotatable primary and secondary winding means connected respectively to said commercial alternating current source and said electric clock circuit, reversible driving means for rotating one of said winding means in either direction relative to the other, control means for said driving means disposed to effect reverse operation of the same, master clock means, synchronous motor means connected for energization to said electric clock circuit, differential gearing means operatively interconnecting said control means with said master clock means and said synchronous motor means, and lost motion means between said control means and said master clock and synchronous motor means for automatically resetting said electric clocks to the time of said master clock means on restoration of said commercial alternating current source after failure thereof for appreciable periods of time.

11. In a time distributing system, the combination with a commercial alternating current source of an electric clock circuit adapted to have a plurality of electric clocks connected thereto, a frequency converter having relatively rotatable primary and secondary winding means connected respectively to said commercial alternating current source and said electric clock circuit, reversible driving means for rotating one of said winding means in either direction relative to the other, control means for said driving means disposed to effect reverse operation of the same, master clock means, synchronous motor means connected for energization to said electric clock circuit, differential gearing means operatively interconnecting said control means with said master clock means and said synchronous motor means, and lost motion means between said differential gearing means and said master clock and synchronous motor means for permitting operation of said master clock means during failure of said commercial alternating current source for appreciable periods of time and for automatically resetting said electric clocks to the time of said master clock means on restoration of said commercial alternating current source.

FREDERICK C. HOLTZ.